(No Model.)

J. H. MICHENER, Jr.
SOLDERING APPARATUS.

No. 419,785. Patented Jan. 21, 1890.

WITNESSES:
John W. Deemer
C. Sedgwick

INVENTOR:
J. H. Michener Jr.
BY Munn & Co.
ATTORNEYS.

UNITED STATES PATENT OFFICE.

JOHN H. MICHENER, JR., OF PHILADELPHIA, PENNSYLVANIA.

SOLDERING APPARATUS.

SPECIFICATION forming part of Letters Patent No. 419,785, dated January 21, 1890.

Application filed August 1, 1889. Serial No. 319,390. (No model.)

*To all whom it may concern:*

Be it known that I, JOHN H. MICHENER, Jr., of Philadelphia, in the county of Philadelphia and State of Pennsylvania, have invented a new and Improved Soldering Apparatus, of which the following is a full, clear, and exact description.

This invention relates to soldering apparatus, and has a special reference to that class of soldering-machines which are employed in soldering tin cans.

This invention has for its object to provide a soldering apparatus by means of which soldering may be carried on in a cheap, expeditious, and effective manner.

The invention consists in a soldering apparatus and in details thereof, constructed and arranged as hereinafter described and claimed.

Reference is to be had to the accompanying drawings, forming a part of this specification, in which similar figures of reference indicate corresponding parts in all the views.

Figure 1:
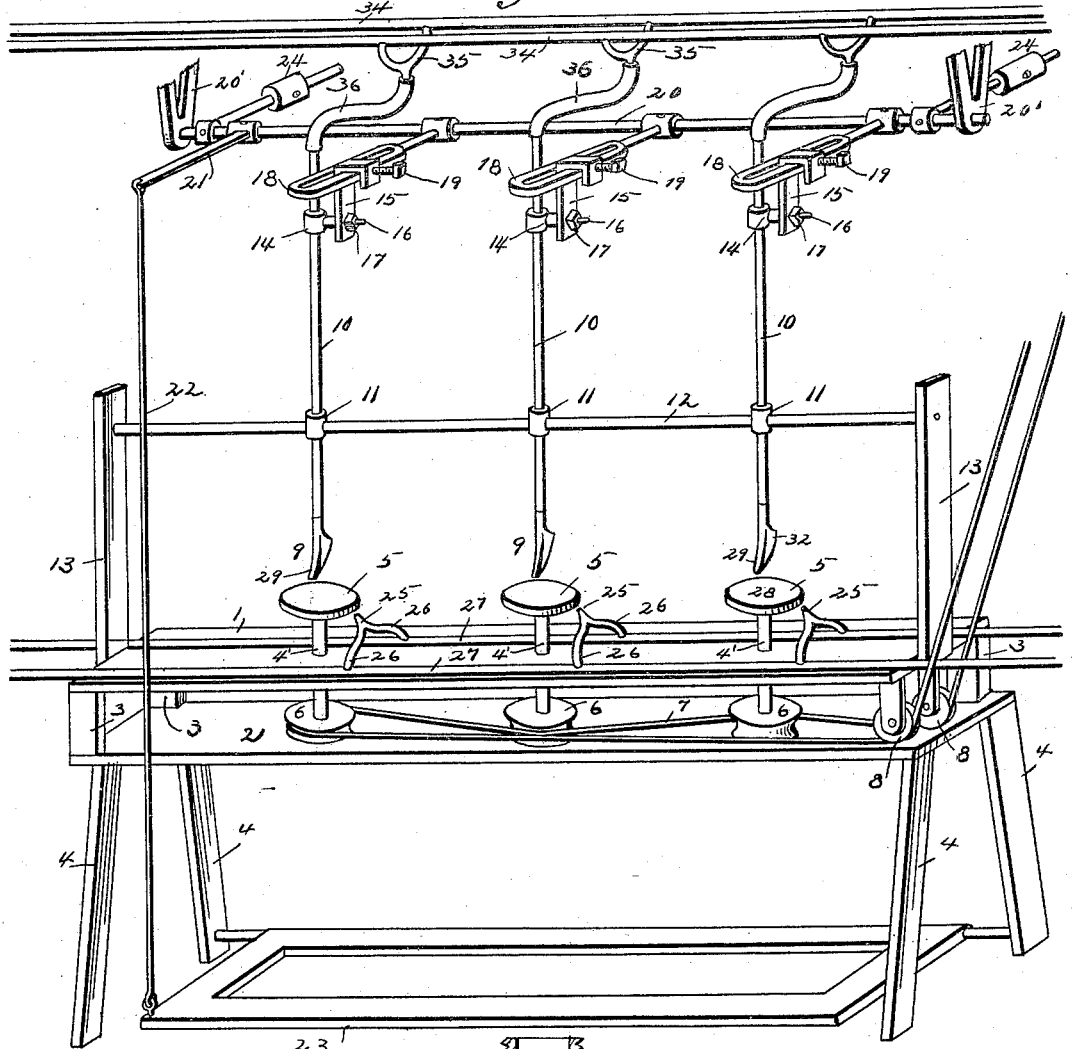
Figure 2:
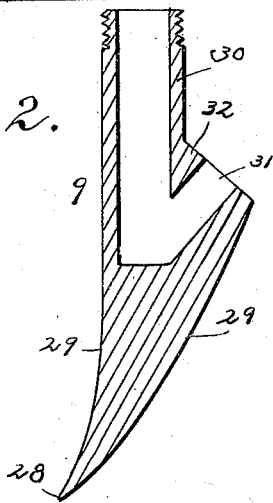

Figure 1 is a view of the invention, and Fig. 2 is an enlarged detail view, in vertical section, of a soldering-iron.

In carrying out this invention a suitable table is provided, constructed as here shown, with a double top 1 2, spaced by means of the block or supports 3, and mounted on the legs 4. Mounted in the double top 1 2 are located any number of vertical rotary shafts 4', projecting a short distance above the upper portion 1 of the table-top, and having mounted thereon rotary can-supporting metallic disks 5. The disks 5 may be rotated by any suitable mechanism and, as here shown, by means of grooved pulleys 6, mounted on the vertical shafts 4' above the lower portion 2 of the table-top, and driven by an endless cord or band 7, extending over the pulleys 6 and over pulleys 8 to a suitable driving power. Above the rotary disks 5 are located soldering-irons 9, mounted on the lower end of hollow vertical pipes 10, extending through sleeves 11 on a horizontal bar 12, supported in vertical uprights 13, extending upward from the ends of the double table-top 1 2. The upper ends of the vertical rotary shafts 10 project through and are held by bracket-arms 14, secured to depending L-shaped arms 15 by means of threaded ends 16 and nuts 17, engaging the same and clamping against the depending arms 15. The arms 15 are secured to and adjustable upon slotted bracket-arms 18 by means of set-screws 19, the arms 18 projecting from a rock-shaft 20, having its bearings in the hangers 20', suspended from a suitable support. By means of this construction the soldering-irons 9 may be raised and lowered to the work, resting on disks 5 by rocking the shaft 20, which vibrates the arms 18 and raises and lowers the vertical pipes 10 and the soldering-irons 9 thereon.

The rock-shaft 20 is operated by an arm 21, projecting therefrom and connected by a vertical rod 22 with a treadle 23, the arm 21 being drawn down by the pressure of the foot on treadle 23, and raised upon releasing the treadle by the reaction of counterweighted arms 24, which elevates the irons 9 from the disks 5.

In order to heat the rotary disks 5 and the work resting thereon, burners 25 are located beneath the disks 5 and are connected by branch arms 26 with the pipes 27, extending along the upper portion 1 of the table and connecting with a suitable air and gas apparatus for supplying a blow-pipe flame to the disks 5.

The soldering-irons 9 are constructed as follows: Each iron 9 is preferably constructed of steel instead of copper, thereby affording an effective, durable, and inexpensive burner, since the irons now made of copper do not answer as well as steel for a heated metal to hold the solder in the seam, because there is virtually no wear in steel, while it becomes necessary to forge the copper-irons twice and three times a day. The burners 9 are of considerable length, curved as shown, and formed at their lower end with a sharp edge 28 and flat front and rear portions 29. With a soldering-iron of this construction access may be readily had to the circular seams on the top and bottom of the cans being soldered. The soldering-irons 9 are also formed with the tubular portion 30, communicating with the vertical pipes 10 and with an opening 31 in a shoulder 32 of the soldering-iron. The soldering-irons 9 are screwed onto the lower ends of pipes 10, or may be secured thereto in any other suitable manner. The opening 31 serves as an outlet for the excess of heat, the direct flame into the iron heating it sufficiently to melt the solder. The gas and air supplied to burner 33 is conveyed through shafts 10 from pipes 34, connected with a suitable gas and air apparatus, and with the pipes 10 by means of the branch pipes 35 and the pipes 36, the latter being flexible, so as to permit the shafts 10 to be raised and lowered with the irons 9. It will thus be seen by the foregoing description that cans may be soldered in a rapid and effective manner, heat being applied to the disks 5, rotating with the work thereon, and to the soldering-irons 9, which are readily lowered to and raised from the work by the treadle 23 and the mechanism connected therewith By means of this invention three times the number of cans may be soldered as heretofore, and but one person will be necessary to operate the machine, instead of several.

Having thus described my invention, what I claim as new, and desire to secure by Letters Patent, is—

1. In a soldering apparatus constructed with rotary work-supporting disks and heating-burners therefor, vertically-movable soldering-irons, in combination with a treadle mechanism for raising and lowering the soldering-irons above the disks, substantially as shown and described.

2. In a soldering apparatus constructed with rotary work-supporting disks and heating-burners therefor, vertically-movable soldering-irons, in combination with a counterweighted treadle mechanism for lowering and automatically raising the soldering-irons above the disks, substantially as shown and described.

3. In a soldering apparatus, the combination, with a soldering-table, of a rock-shaft above the table, a number of pipes connected to the rock-shaft, soldering-irons on the lower ends of the tubes, gas and air pipes above the rock-shaft, a flexible connection between the pipes carrying the soldering-irons and the air and gas pipes, and a treadle mechanism for operating the rock-shaft, substantially as and for the purpose set forth.

4. In a soldering apparatus constructed with rotary can-supporting disks, and blow-pipe burners located adjacent to the rotary disks, the combination, with a treadle mechanism, of a rock-shaft having counterweighted and vibrating arms, and vertically-movable gas and air supply pipes having soldering-irons at their lower ends and mounted on the vibrating arms, substantially as shown and described.

5. In a soldering apparatus constructed with rotary can-supporting disks and blow-pipe burners located adjacent to the rotary disks, the combination, with a treadle mechanism, of a rock-shaft having counterweighted and vibrating arms, and vertically-movable gas and air supply pipes having soldering-irons at their lower ends and adjustable on the vibrating arms, substantially as shown and described.

6. A soldering apparatus consisting of rotary can-supporting disks, blow-pipe burners located adjacent to the rotary disks, and vertically-movable gas and air supply pipes having soldering-irons located above the rotary disks, in combination with a treadle mechanism, a rock-shaft having counterweighted and vibrating arms, vertically-movable gas and air supply pipes with soldering-irons at their lower ends and adjustably connected to the vibrating arms, and gas and air supply pipes connected by flexible pipes with the vertically-movable pipes, substantially as shown and described.

JOHN H. MICHENER, JR.

Witnesses:
E. M. CLARK,
C. SEDGWICK.